United States Patent [19]

McGugan et al.

[11] Patent Number: 4,902,045
[45] Date of Patent: Feb. 20, 1990

[54] CONNECTORS

[75] Inventors: John D. McGugan; Michael J. Mackie; Norman Buckley, all of Aberdeen, Scotland

[73] Assignee: Hunting Oilfield Services Limited, Aberdeen, Scotland

[21] Appl. No.: 128,104

[22] Filed: Dec. 3, 1987

[51] Int. Cl.$^4$ .......... F16D 1/10; F16L 21/06; F16L 21/08; F16L 37/00
[52] U.S. Cl. ............................ 285/24; 279/1 L; 285/82; 285/322; 103/13; 103/289
[58] Field of Search ............ 285/322, 323, 315, 319, 285/81, 321, 24, 308, 27; 403/13, 14, 371, 289, 290; 279/1 L

[56] References Cited

U.S. PATENT DOCUMENTS

| | | | |
|---|---|---|---|
| 1,904,061 | 4/1933 | Larson . | |
| 2,784,987 | 3/1957 | Corcoran | 285/322 X |
| 3,096,999 | 7/1963 | Ahlstone et al. | 285/322 X |
| 3,325,194 | 6/1967 | Brawey | 285/322 X |
| 3,339,944 | 9/1967 | Poague . | |
| 3,497,243 | 2/1970 | Gruller et al. | 285/322 X |
| 3,628,812 | 12/1971 | Larralde et al. | 285/322 X |
| 3,885,851 | 5/1975 | Bennett | 403/290 X |
| 4,120,519 | 10/1978 | Bridges | 285/322 X |
| 4,373,753 | 2/1983 | Ayers et al. . | |
| 4,398,757 | 8/1983 | Floyd et al. | 285/322 X |
| 4,526,406 | 7/1985 | Nelson | 285/315 X |
| 4,557,508 | 12/1985 | Walker | 265/315 X |
| 4,616,855 | 10/1986 | Ruhle | 285/319 X |

FOREIGN PATENT DOCUMENTS

| | | |
|---|---|---|
| 0241990 | 10/1987 | European Pat. Off. . |
| 1310713 | 10/1962 | France . |
| 577184 | 5/1946 | United Kingdom . |
| 1085273 | 9/1967 | United Kingdom . |
| 2135748 | 12/1967 | United Kingdom . |
| 1339801 | 12/1973 | United Kingdom . |
| 1460629 | 1/1977 | United Kingdom .. |

Primary Examiner—Randolph A. Reese
Assistant Examiner—Paul M. Frechette
Attorney, Agent, or Firm—Watson, Cole, Grindle & Watson

[57] ABSTRACT

A connector comprises a first coupling assembly comprising a first coupling member associated with an annular body from which extend a plurality of radially flexible fingers provided at their ends with engagement ribs engageable in grooves in a second coupling member to be abutted against the first coupling member. The fingers are held in their radially inner engaged position by a locking ring axially movable relative to the annular body between a locking position and an inoperative position. The locking ring may be associated a disengagement portion which, as the locking ring moves to its inoperative position, engages the ends of the fingers to move them radially outwardly to disengage the ribs from the grooves. The annular body may be axially movable relative to the first coupling member or fixed relative thereto. When fixed, guide vanes may be provided between the fingers to define a guide surface in the region of the ribs which lies between the operative and inoperative positions of the fingers to prevent inadvertent contact of the ribs and grooves when the fingers are in their inoperative positions.

29 Claims, 8 Drawing Sheets

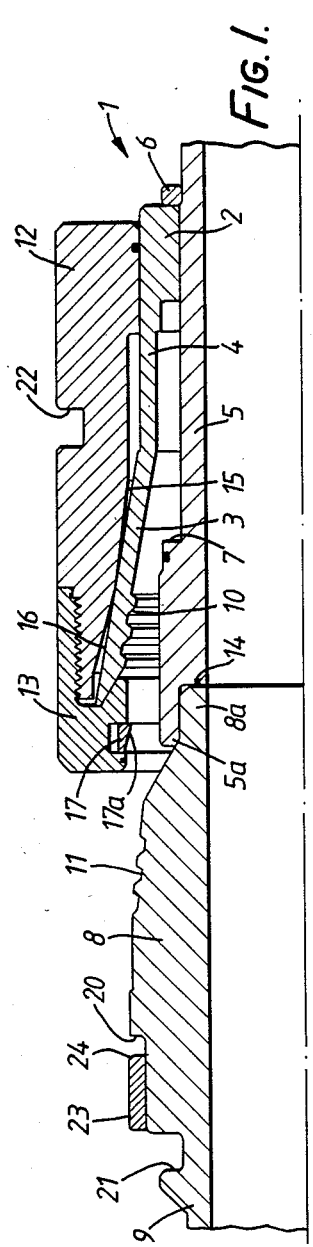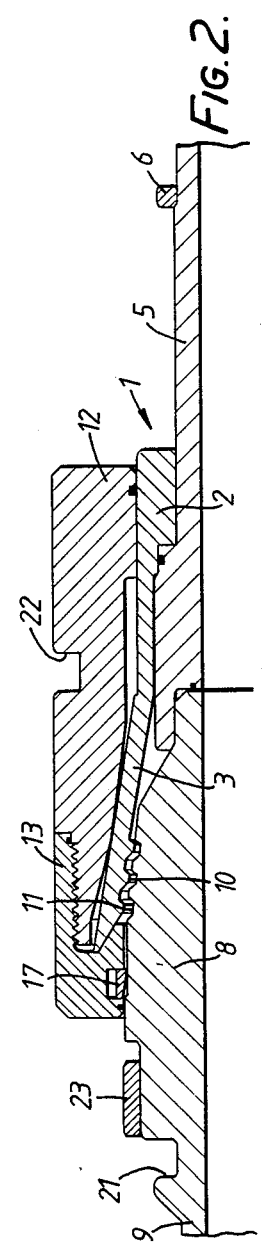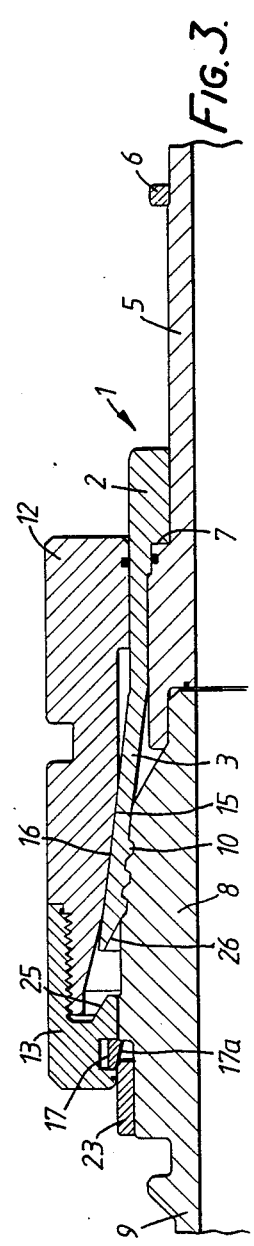

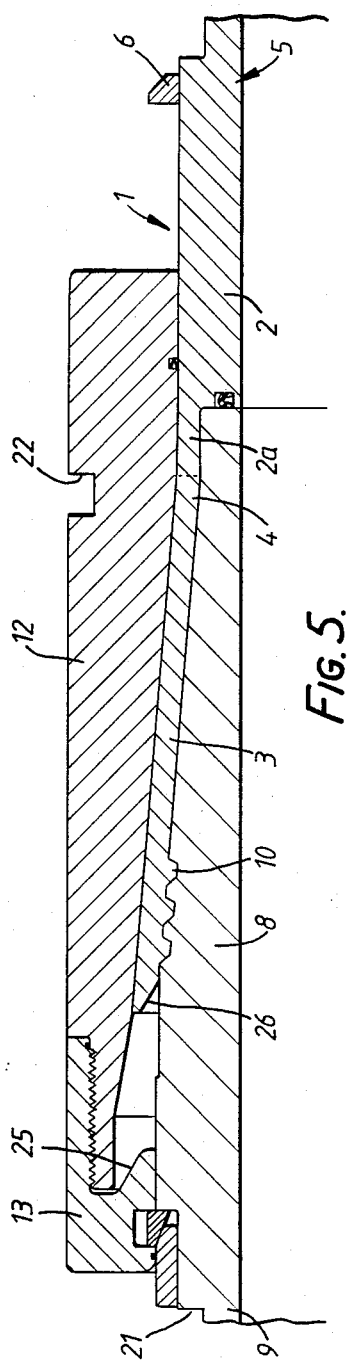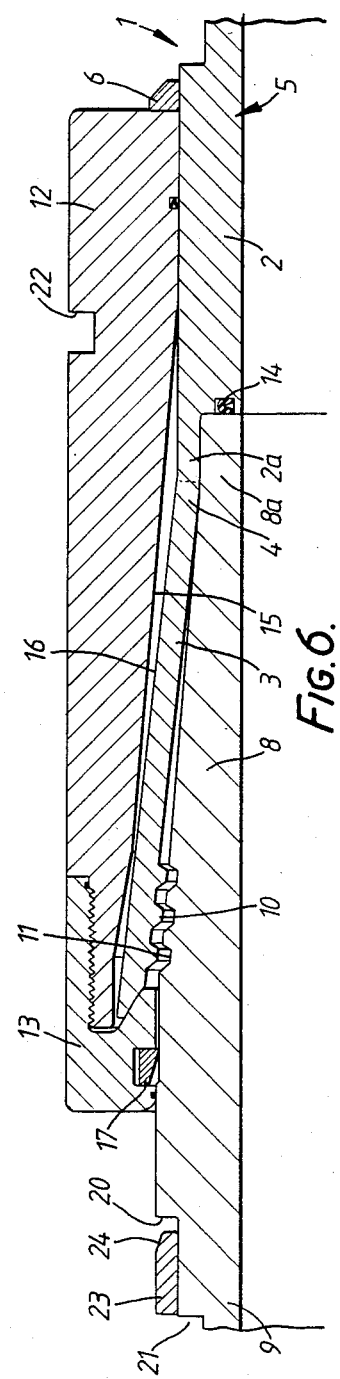

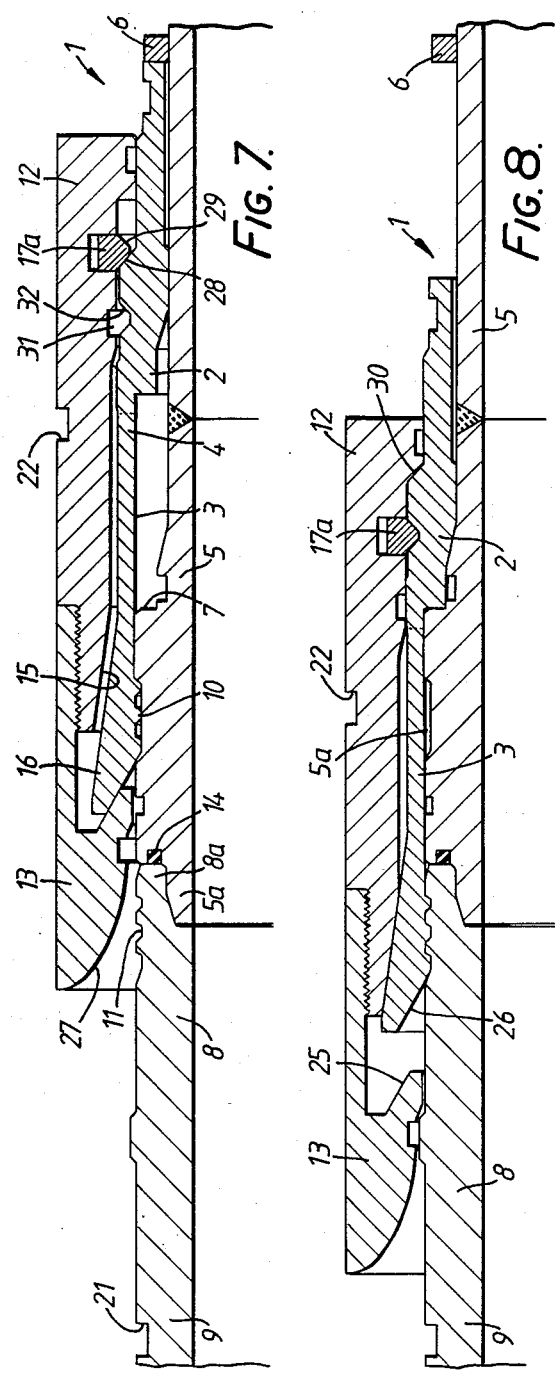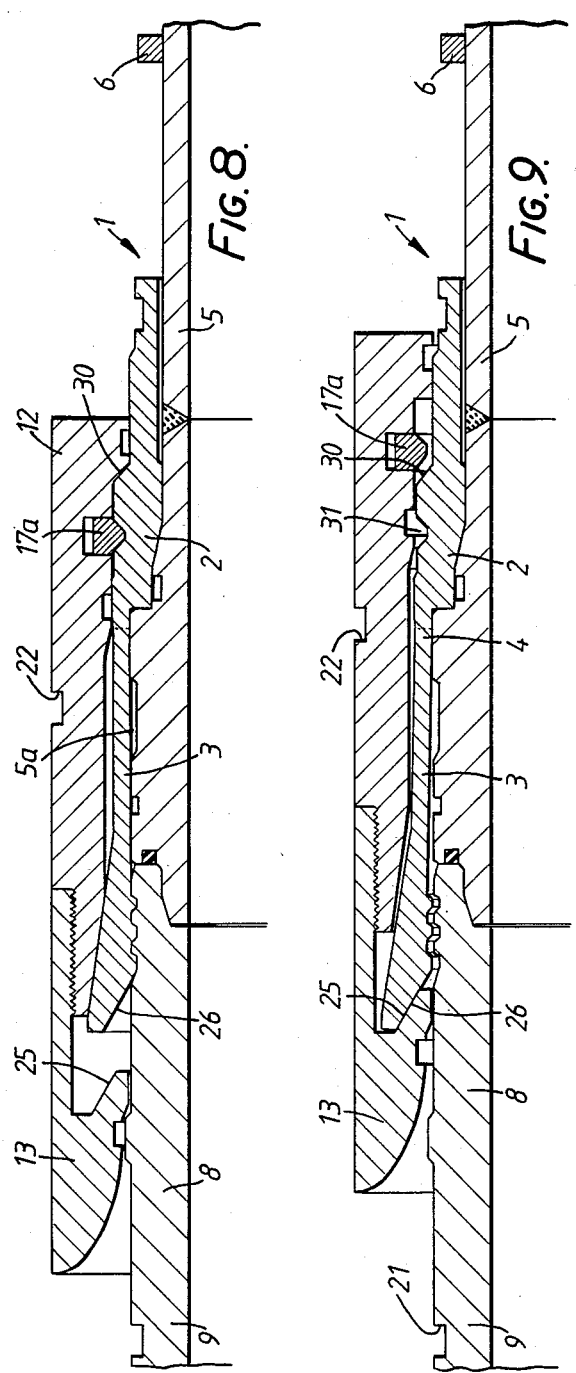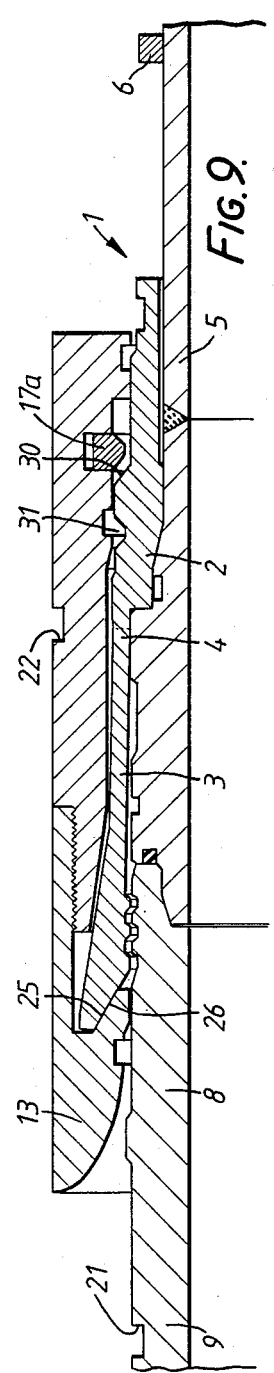

CONNECTORS

The present invention relates to connectors for connecting members which may for example be tubular, for example pipe sections, or solid, for example rods.

According to a first aspect of the present invention there is provided a connector comprising a first coupling assembly comprising an annular body associated with a first coupling member for coupling to a second coupling member, the annular body having a plurality of radially flexible fingers extending generally axially therefrom, the fingers having end portions provided with engagement means for engagement with corresponding engagement means on the second coupling member, the fingers being radially flexible between an inoperative position and an operative position in which the engagement means are engaged, and a locking ring axially movable relative to the annular body of the first coupling assembly between an inoperative position and a locking position in which it extends around the fingers so as to prevent disengagement of the engagement means.

According to a second aspect of the present invention there is provided a connector comprising a first coupling assembly comprising an annular body associated with a first coupling member for coupling to a second coupling member, the annular body having a plurality of radially flexible fingers extending generally axially therefrom, the fingers having end portions provided with engagement means for engagement with corresponding engagement means on the second coupling member, the fingers being radially flexible between an inoperative position and an operative position in which the engagement means are engaged, a locking ring axially movable relative to the annular body of the first coupling assembly between an inoperative position and a locking position in which it extends around the fingers so as to prevent disengagement of the engagement means, and disengagement means engageable with the fingers to move the fingers from their operative position for disengaging the engagement means to permit uncoupling of the first and second coupling members.

Where the fingers are axially fixed relative to the first coupling member, during coupling and uncoupling of the connector, if there is any tendency for the coupling members to move from a coaxial condition, the engagement means on some of the fingers may catch or snag the engagement means of the second coupling member, thereby preventing smooth coupling or uncoupling. Particularly where the connector is designed to provide a quick release, such snagging between the engagement means during uncoupling is a particular disadvantage.

According to a third aspect of the present invention there is provided a connector comprising a first coupling assembly comprising an annular body associated with a first coupling member for coupling to a second coupling member, the annular body having a plurality of radially flexible fingers extending generally axially therefrom, the fingers having end portions provided with engagement means for engagement with corresponding engagement means on the second coupling member, the fingers being radially flexible between an inoperative position and an operative position in which the engagement means are engaged, a locking ring axially movable relative to the annular body of the first coupling assembly between an inoperative position and a locking position in which it extends around the fingers so as to prevent disengagement of the engagement means, and a plurality of guide members extending between at least some of the fingers and adapted to prevent engagement between the engagement means when the fingers are in their inoperative position.

According to a fourth aspect of the present invention there is provided a connector comprising a first coupling assembly comprising an annular body associated with a first coupling member for coupling to a second coupling member, the annular body having a plurality of radially flexible fingers extending generally axially therefrom, the fingers having end portions provided with engagement means for engagement with corresponding engagement means on the second coupling member, the fingers being radially flexible between an inoperative position and an operative position in which the engagement means are engaged, a locking ring axially movable relative to the annular body of the first coupling assembly between an inoperative position and a locking position in which it extends around the fingers so as to prevent disengagement of the engagement means, disengagement means engageable with the fingers to move the fingers from their operative position for disengaging the engagement means to permit uncoupling of the first and second coupling members, and a plurality of guide members extending between at least some of the fingers and adapted to prevent engagement between the engagement means when the fingers are in their inoperative position.

With reference to the above-described aspects of the present invention, the fingers may be in a relaxed condition in their operative position or in their inoperative position. The engagement means provided on the fingers may advantageously comprise one or more circumferentially extending ribs engageable in one or more correspondingly shaped recesses in the outer surface of the second coupling member. These ribs and recesses may be so shaped as to cause abutted surfaces of the coupling members to be pre-loaded into abutment as the engagement means are engaged. The locking ring may advantageously be provided with an internal, generally frusto-conical surface for engaging corresponding generally part frusto-conical surfaces on the fingers, to move or ensure movement of the fingers radially inwardly to their operative positions during movement of the locking ring from its inoperative position to its locking position.

The above referred to disengagement means is advantageously associated with the locking ring and is movable therewith. The disengagement means may comprise an annular body which may be formed integrally with or fixed to the locking ring and may have a generally frusto-conical surface which contacts corresponding part generally frusto-conical surfaces on end portions of the fingers, to move the fingers radially outwardly, on movement of the locking ring to its inoperative position, to disengage the engagement means.

The above referred to guide members advantageously comprise generally axially extending radially inner edge portions which are arranged to extend radially inwardly of the engagement means provided on the fingers, when the fingers are in their inoperative position, but yet, when the fingers are in their operative position, are positioned radially outwardly thereof. These guide members may take the form of radially extending vanes whose inner edge portions co-operate to define a guide surface for guiding the second coupling member. The guide surface defined thereby may be shaped to generally conform to the shape of the second coupling member in the region of its engagement means, e.g., it may be generally frusto-conical. Radially outer edge portions of the vanes may advantageously extend axially to define a surface for guiding the locking ring during axial movement thereof.

Further features and advantages of the present invention will become apparent from the following description of embodiments thereof, given by way of example only, with reference to the accompanying drawings.

BRIEF DESCRIPTION OF THE DRAWINGS

In the drawings:

FIGS. 1 to 3 are axial sections through a first embodiment of connector according to the present invention showing the members of the connector in different relative positions assumed during coupling;

FIGS. 5 and 6 are axial sections through another embodiment of connector according to the present invention and showing the various members in two relative positions;

FIGS. 7 to 9 are axial sections through a further embodiment of connector according to the present invention showing the members in various relative positions;

DETAILED DESCRIPTION OF THE PREFERRED EMBODIMENTS

Figure 4:
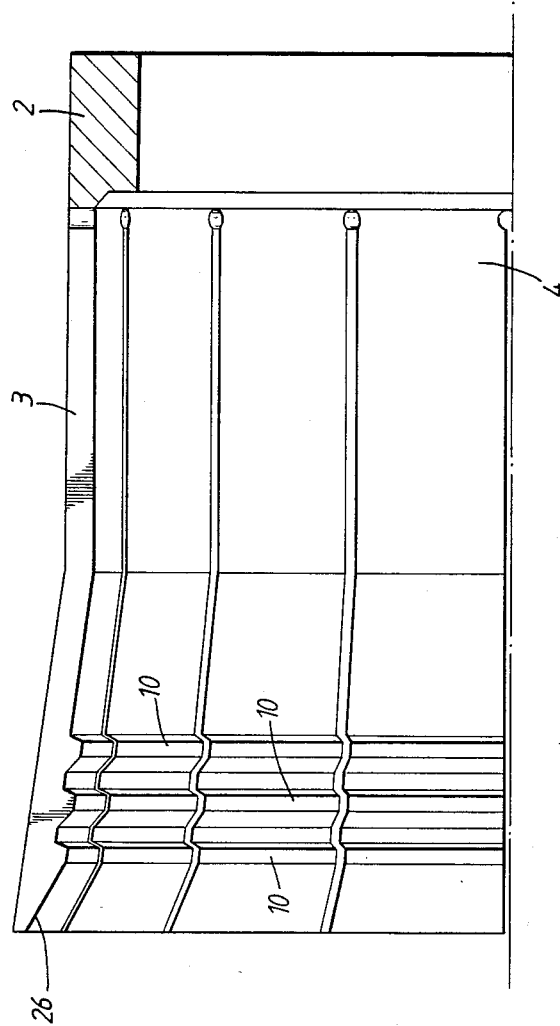
FIG. 4 is an axial section through the first coupling member of the embodiment of FIGS. 1 to 3.
Figure 10:
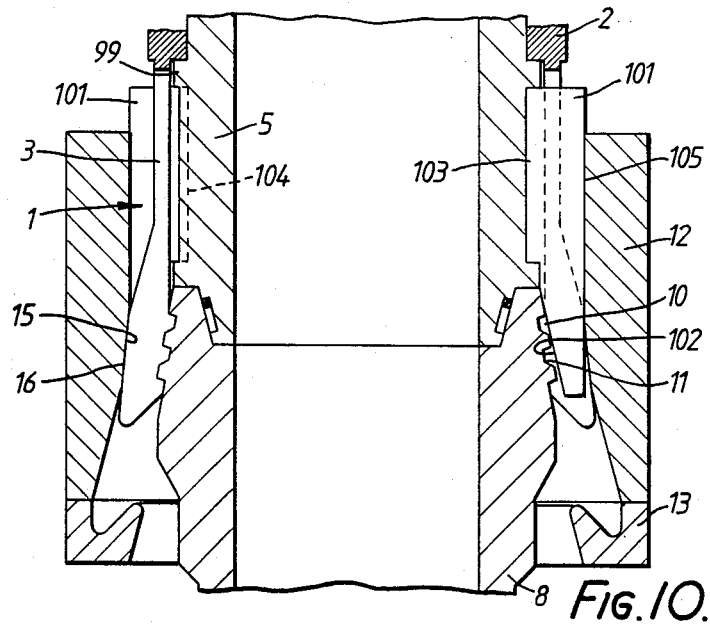
FIGS. 10 and 11 are diagrammatic sectional views of a further embodiment of connector according to the present invention, FIG. 10 showing the connector in a fully coupled condition and FIG. 11 showing the connector in an uncoupled condition.
Figure 11:
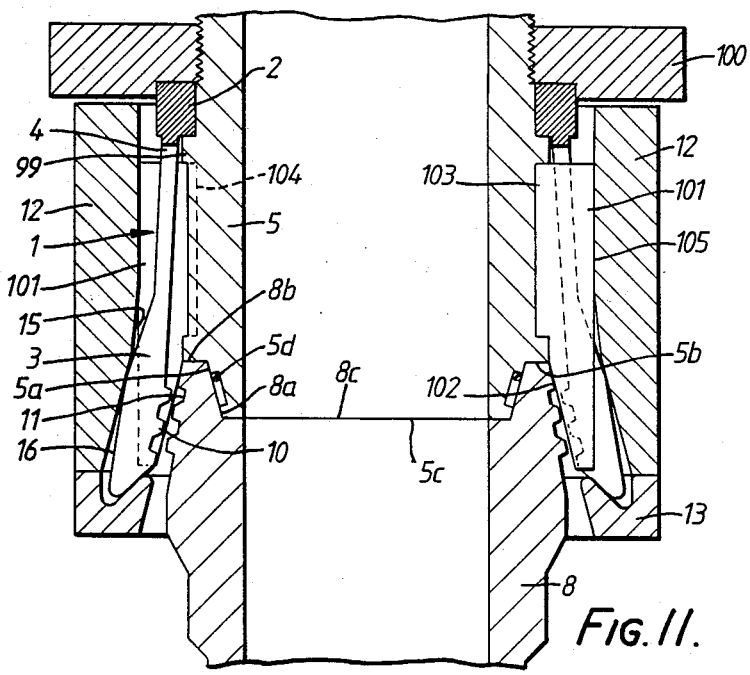
Figure 12:
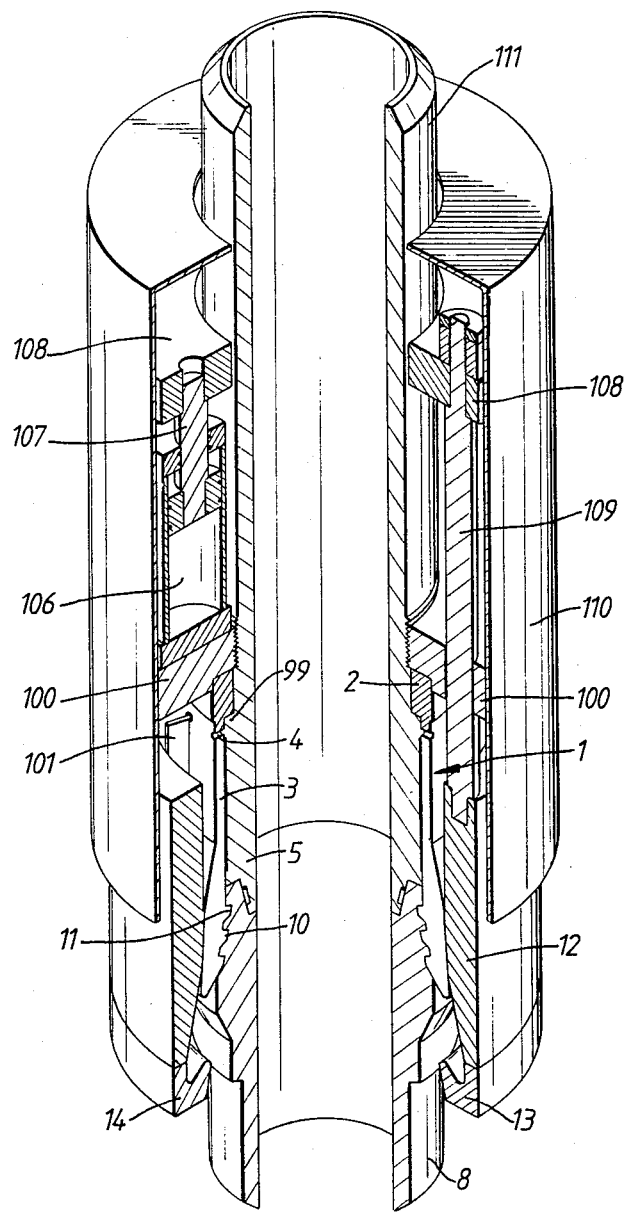
FIG. 12 is a partially cut away perspective view of the connector of FIGS. 10 and 11.

The connector shown in FIGS. 1 to 4 comprises a first coupling assembly 1 comprising an annular body or ring 2 from which radially flexible fingers 3 extend generally axially, and a first coupling member 5 for coupling to a second coupling member 8. The fingers 3 are radially flexible between a radially inner operative position (FIG. 3) and a radially outer inoperative position (FIG. 1) and are shaped to flex about the regions 4 of their connections to the ring. The fingers 3 are preferably made integrally with the ring 2, e.g., from an annular component which is cut axially to form the fingers 3. The number of fingers 3 provided depends on and increases with the internal diameter of the member 5 to be coupled. By way of example, for a member with a 3" nominal bore nine fingers may be provided and for a member with a 6" nominal bore sixteen to eighteen fingers may be provided.

In this embodiment, ring 2 is axially slidable on member 5 between a retracted inoperative position (FIG. 1) abutting a stop 6 and an advanced engagement position (FIGS. 2 and 3) abutting a shoulder 7 on the end of the member 5.

End portions of the fingers 3 are provided with engagement means engageable with corresponding engagement means on the second coupling member 8. As shown, the engagement means comprise a plurality of circumferentially extending ribs 10 on the inner surfaces of the end portions of the fingers 3 and correspondingly shaped recesses 11 in the outer surface of member 8.

A locking ring 12 is provided around body 2 to be slidable axially thereon between a retracted inoperative position (FIG. 1) and an extended locking position (FIG. 3) in which it prevents disengagement of the engagement means 10, 11 by holding the fingers 3 in their radially inner operative position.

The connector also, as shown, comprises disengagement means 13 for use in uncoupling the members 5, 8. In this embodiment the disengagement means is associated with the locking ring 12 for movement therewith. The disengagement means also serves to hold the fingers 3 in their radially outer inoperative or disengaged condition (FIGS. 1 and 2) during coupling and uncoupling of the connector. As shown, member 13 is made separately from locking ring 12 and is fixed thereto by welding or, as shown, by threading. Alternatively, the member 13 may be formed integrally with ring 12.

In use of the above-described connector, the ring 2 is mounted on member 5 and locking ring 12 is positioned in its inoperative position with the disengagement member 13 holding the fingers 3 of ring 2 in their radially outer inoperative and disengaged position, as shown in FIG. 1. The members 5 and 8 are then aligned and brought together. It will be appreciated that the configuration of the end surfaces of members 5 and 8 can be varied as required. As shown, members 5 and 8 have telescoping end portions 5a, 8a. The contacting peripheral surfaces of these portions may be shaped to establish an interference fit therebetween and/or the radial end surface of portion 8a may form a metal-to-metal seal with the corresponding surface of member 5 which may additionally, as shown, be provided with an annular seal 14.

When members 5 and 8 have been brought into alignment and abutment, ring 2 is moved axially to its extended position in abutment with shoulder 7, as shown in FIG. 2, in which position ribs 10 are aligned with recesses 11. Locking ring 12 is then moved relative to annular ring 2 to its axially extended position as shown in FIG. 3. During this movement, the disengagement member 12 disengages from the fingers 3 and an internal generally frusto-conical surface 15 on locking ring 12 comes into contact with corresponding generally frusto-conical surfaces 16 on fingers 3 to hold the ribs 10 of the fingers 3 in the recesses 11.

The ribs 10 and recesses 11 shown in FIGS. 1 to 4 have inclined lateral surfaces. With appropriate tolerancing of ring 2 in relation to members 5 and 8, engagement of the ribs 10 in the recesses 11 can also be used to pre-load the surfaces of members 5, 8 which are brought into abutment. Locking ring 12 may thus apply a positive radial force to the fingers 3 to force the ribs 10 into the recesses 11.

The locking ring may be held in its locking position (shown in FIG. 3) by retaining means which may act to releasably retain the locking ring relative to annular ring 2, or either of members 5, 8. As shown, retaining means are associated with the disengagement member 13 which carries a split ring 17 which is biased to a circumferentially contracted condition. When the locking ring 12 is in its locking position, split ring 17 engages behind a shoulder 20 provided on member 8.

The assembly of the connector as described above may be effected using a hydraulic cylinder assembly which may, for example, engage in clamping recesses 21 and 22 provided in the exterior surfaces of member 8 and ring 12 and behind ring 2 and stop 6 which is fixed on member 5.

To uncouple the connector, ring 23 which is threaded on to member 8 behind shoulder 20 is initially operated to disengage split ring 17 from shoulder 20. Ring 23 may alternatively be axially slidable on member 8, and is provided with a frusto-conical leading surface 24 which engages with a correspondingly frusto-conical surface 17a of the split ring 17 to cause the ring 25 to expand and so disengage it from shoulder 20. The locking ring 12 carrying with it the disengagement member 13 is then moved relative to annular ring 2 towards its retracted position (FIG. 2). In so moving, surface 15 of member 12 disengages from surfaces 16 of the fingers so that the ribs 10 can be released from the recesses 11 and then a frusto-conical surface 25 on the disengagement member 13 engages under corresponding frusto-conical surfaces 26 of the fingers to progressively flex the fingers radially outwardly to bring the ribs 10 out of engagement with the recesses 11. Once the ribs 10 are disengaged from the recesses 11, the annular ring 2 is then free to be moved to its retracted position on pipe section 5 enabling uncoupling of member 5 from member 8.

As described above, the annular ring 2 is made so that the relaxed position of the fingers 3 corresponds to their engaged or operative position. Alternatively, the relaxed condition of the fingers may correspond to their disengaged or inoperative position (FIG. 1) so that, during coupling, the disengagement means 13 merely holds the fingers 3 in their relaxed position and the locking ring 12 then positively flexes the fingers radially inwardly to engage the ribs 10 in the recesses 11.

In the above-described embodiment, the first coupling member 5 may be formed on the end of a pipe section or may be made as a separate component for fixing, e.g., welded or bolted using flanges, to a pipe section or other component to be connected thereby. Similarly member 8 may be formed on the end of a pipe section 9 or may be made as a separate component for fixing, e.g., welded or bolted, to another component which may be a pipe section.

The embodiment of connector shown in FIGS. 5 and 6 corresponds with that shown in FIGS. 1 to 4 except that, in this embodiment, annular ring 2 is made integral with the first coupling member 5. The ring 2 may be formed by an end portion of member 5 or may be made separately from member 5 and be fixed, e.g., welded, thereto. The same reference numerals are used for the embodiment of FIGS. 5 and 6 as are used in the embodiment of FIGS. 1 to 4 for like parts. However, in this embodiment, the telescoped portion 5a of FIGS. 1 to 4 is formed by portion 2a which forms part of the ring 2 of assembly 1 and shoulder 7 of the embodiment of FIGS. 1 to 4 is in effect formed by the end surface of member 8.

As in the preceding embodiment, member 5 is assembled with locking ring 12 and disengagement member 13 as shown in FIG. 6, with the disengagement member 13 holding the fingers 3 in their inoperative or radially outwardly flexed condition. Members 5 and 8 are then aligned and abutted, as shown in FIG. 6, and then locking ring 12 with disengagement member 13 is moved to its extended operative or locking position, as shown in FIG. 5, to hold the ribs 10, provided on fingers 3, in the recesses 11 in member 8. In this position, locking ring 12 is held in place by engagement of split ring 17 behind shoulder 20 on member 8.

Uncoupling of the connector is effected in exactly the same way as described in the embodiment of FIGS. 1 to 4, initially using ring 23 to disengage split ring 17 from shoulder 20. Locking ring 12 with disengagement member 13 is then moved to its retracted position in which the disengagement member 13 is engaged with the fingers to hold them in their radially outwardly flexed position. As in the previous embodiment, the components of this connector may be moved using a hydraulic cylinder assembly assembled around the connector.

The embodiment of FIGS. 7 to 9 is again generally similar to that of FIGS. 1 to 4 and the same reference numerals have been used for like parts. However, in this embodiment, the fingers 3 of annular ring 2 are in their relaxed condition in their radially inner position and, in that position, extend substantially axially, the ribs 10 of the fingers 3 and the corresponding recesses 11 of the member 8 being formed on and in cylindrical surfaces rather than, as in the previous embodiments, on frustoconical surfaces. In the position assumed by the ring 2 when fully retracted on the member 5 (FIG. 7), the member 5 is provided with an annular groove 5a aligned with the ribs 11 and for receiving the ribs 11. The locking ring 12 and disengagement member 13 are coupled together so that, when the locking ring 12 is in its fully retracted or inoperative position (FIG. 7) relative to member 1, the disengagement ring 13 can be moved forwardly on ring 2 so that, although frustoconical surface 25 of the disengagement ring 13 is still in contact with the corresponding surfaces 26 of the fingers, the fingers are returned to their relaxed radially inward position with the ribs 11 received in groove 5a and the fingers are therefore unstressed. The disengagement member 13 thus, under these circumstances, protects the ends of the fingers 3 during coupling of members 5, 8, but without stress.

In this embodiment, retaining means for retaining the locking ring 12 in its locking position are again provided, but act to retain the locking ring 12 relative to the annular ring 2. As shown it comprises a split ring 17a carried by the locking ring 12. Additionally, the inner surface 27 of the free end of the disengagement member 13 is curved to serve as a guide surface in aligning the two coupling members 5, 8 to be coupled together.

Split ring 17a is, as before, biased to a circumferentially inner position by its natural spring stiffness and serves as a detent for holding the locking ring 12 in its forward retracted position, as well as in its extended position relative to annular ring 2. The inner surface of the locking ring 17a has opposed frusto-conical annular surface portions 28, 29. In the forward retracted position of the locking ring 12, surface portion 28 abuts a correspondingly shaped shoulder 30 on ring 2 and in the extended position of locking ring 12, the split ring is received in a correspondingly shaped groove 31 in ring 2 with surface 29 abutting a corresponding surface 32 of the groove. Surfaces 28, 29, 30 and 32 have an inclination such that, on application of a predetermined axial force, these surfaces will slide over each other to cause the split ring 17a to expand circumferentially so as to disengage it from ring 2, to thereby enable locking member 12 to be moved axially relative to ring 2 between its locking and inoperative conditions.

With the embodiment described above, with reference to FIGS. 5 and 6, when bringing the members 5 and 8 together and particularly when separating them, if either member moves from a coaxial position relative to the other, the ribs 10 of some of the fingers may catch or snag in some of the recesses 11 and thereby temporarily hinder engagement or disengagement. To prevent this and to ensure smooth coupling and uncoupling, guide means may be provided associated with the fingers. Such an arrangement is shown in the embodiment of FIGS. 10 to 13, which is generally similar to the previous embodiments and in which the same reference numerals have been used for similar parts. In this embodiment, the ring 2 with fingers 3 of assembly 1 is formed separately and the ring 2 is fixed rigidly relative to coupling member 5. As shown, ring 2 is shaped to seat on a shoulder 99 of member 5 and is clamped against the shoulder by a collar 100 threaded on to the member 5.

The guide means comprise a plurality of guide members 101 having radially inner generally axially extending edge portions 102 in the region of the ribs 10, which lie between the radially inner and outer positions of the fingers so that when the fingers are in their radially outer inoperative positions, the edge portions 102 together define a guide surface and prevent any possibility of the ribs 10 engaging in the recesses 11. As shown, the guide members 101 are in the form of planar vanes and extend in radial planes between adjacent pairs of fingers 3 in the slots defining the fingers. Preferably a vane 101 is provided in each slot and the edge portions 102 together define a generally frusto-conical guide surface which generally follows the shaping of the surface of member 8 provided with the grooves 11. The vanes 101 are fixed relative to the member 5. For example, as shown, a portion 103 of the radially inner edge of each vane is fixed in a slot 104 in member 5. The vanes may alternatively be fixed to another component, for example annular ring 2, which is fixed relative to member 5. Conveniently, the radially outer edge portions 105 of the vanes define a cylindrical guide surface for guiding the locking ring 12 in its movements between its two positions.

As shown the end surfaces of the members 5 and 8 may comprise corresponding frusto-conical portions 5a, 8a, of which portion 5a is provided with an annular seal 5d, for example a metal seal such as a Helicoflex seal or an O-ring seal with a seal retainer, between two radial portions 5b, 5c and 8b, 8c, one pair of which, e.g. portions 5b, 8b, are brought into abutment. Advantageously the cone angle of surface portions 5a, 5b and the dimensions of the groove in which the seal 5b is retained are arranged so that no deformation of the seal is necessary during installation or replacement of the seal.

In the embodiment shown in FIGS. 10 to 13 the locking ring 12 is, as in the above-described embodiments, moved between its two positions by a hydraulic cylinder assembly. However, in this embodiment the hydraulic cylinder assembly is permanently mounted on the connector, rather than, as in the preceding embodiments, assembled with connector when required. It will be appreciated that a removable hydraulic cylinder assembly may alternatively be used. As shown the hydraulic cylinder assembly comprises a plurality of cylinders 106 which are mounted at equally spaced intervals on the collar 100. The rods 107 connected to the cylinder pistons are fixed to an axially movable transmission ring 108 coaxial with and axially spaced from collar 100. The locking ring 12 is connected to the transmission ring 108 by a plurality of tie bars 109 extending between the locking ring 12 and the transmission ring 108, the bars being arranged between the cylinders 106 and extending through openings provided in collar 100. In operation, when the cylinders are extended the locking ring is moved to its retracted position in which member 13 engages the fingers and holds them in their inoperative position and when the cylinders are retracted the locking member is moved to its locking position holding the fingers in engagement with member 8.

The assembly of cylinders 106 and tie bars 109 may be enclosed in a protective shroud 110 supported on member 5 and extending to overlap locking member 12.

The tie bars 109 may be releasably connected to transmission ring 108 so that during periods when the connector is in use and the locking ring 12 is maintained in its locking position, the cylinders can be operated and the hydraulic circuits connected to them tested without causing uncoupling of the connector. Additionally, to prevent adhesion between the pistons of the cylinders and the cylinders bodies during long periods of inactivity, the cylinders may incorporate extra rod wipers and P.T.F.E. seals. A hydraulic holding force may be maintained in the cylinders at a pressure lower than the operating pressure in periods when the connector is in use to prevent inadvertent uncoupling of the connector.

In common with the previously described embodiments, member 5 may be integral with a pipe section 111 or may be made separately and fixed, e.g., welded, thereto or to another component. Similarly member 8 may be formed on the end of a pipe section 9 or may be made separately and fixed to a pipe section or other component. Where it is made separately, it may for example, as shown in FIG. 13, be welded to a flange 111 by which it is connected directly or, for example as shown, through a valve, to the pipe section 9.

Figure 13:
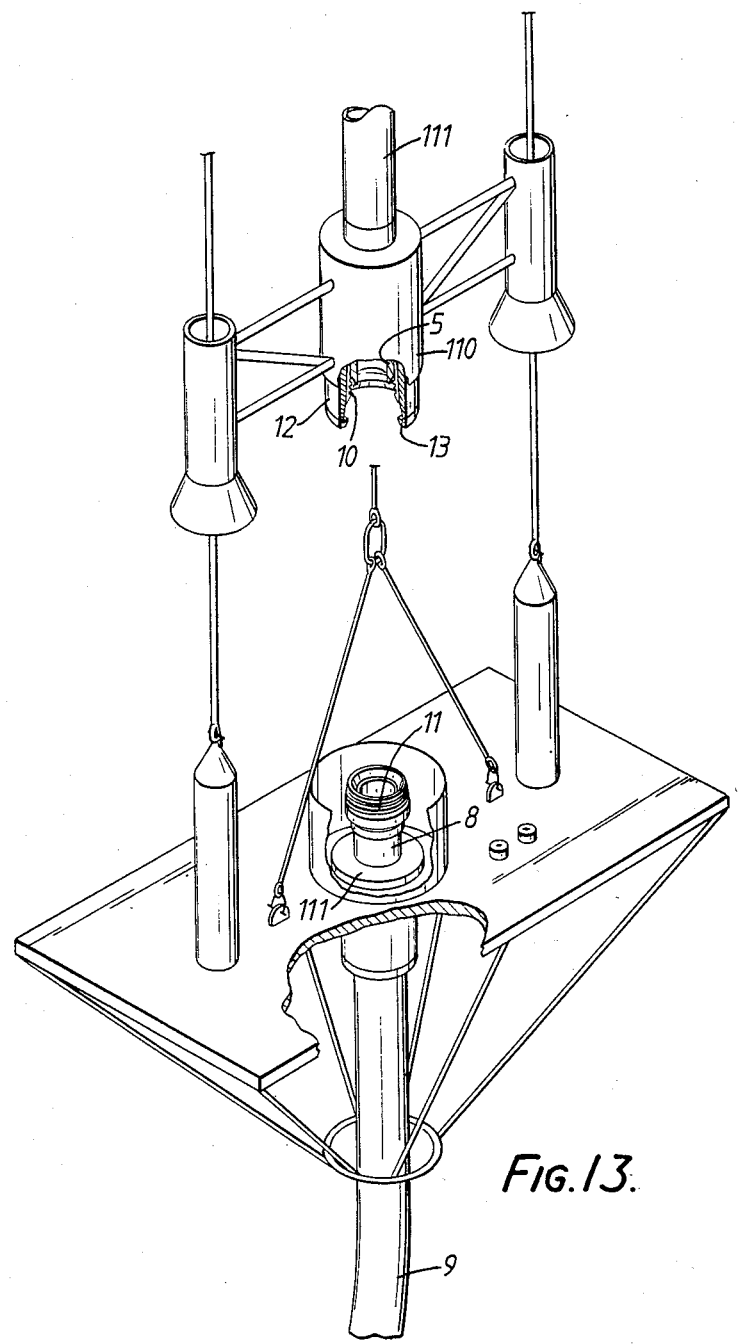
FIG. 13 is a perspective view of the connector of FIGS. 10 to 12 during assembly and showing associated equipment.

By virtue of the provision of the vanes 101 in the embodiment of FIGS. 10 to 13, smooth coupling can be assured, the edge portions 102 of the vanes additionally assisting alignment of member 8 with member 5, and also smooth uncoupling of member 5 and its associated fingers from member 8 can be assured. This means that the connector can be used as a quick-release connector e.g. in a riser connected between a subsea and surface installation. The connector may be located above the water level or below and is designed for remotely controlled operation. Under such circumstances, the connector is preferably orientated as shown in FIGS. 10 to 13 with member 8 below member 5, member 8 preferably being raised into member 5 and its associated components as shown in FIG. 13, or vice versa.

Although in the embodiment of FIGS. 10 to 13 the member 1 is made so that the relaxed condition of the fingers 3 corresponds to their engaged position, it will be appreciated that, in a modification, the relaxed condition of the fingers can correspond to their disengaged position and the disengagement member 13 may then be omitted.

Figure 14:
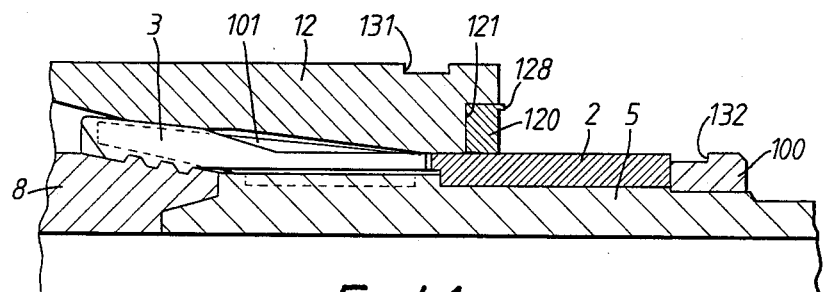
FIG. 14 is a part section through a modification of the connector of FIGS. 10 to 12 showing an embodiment of retaining means.
Figure 15:
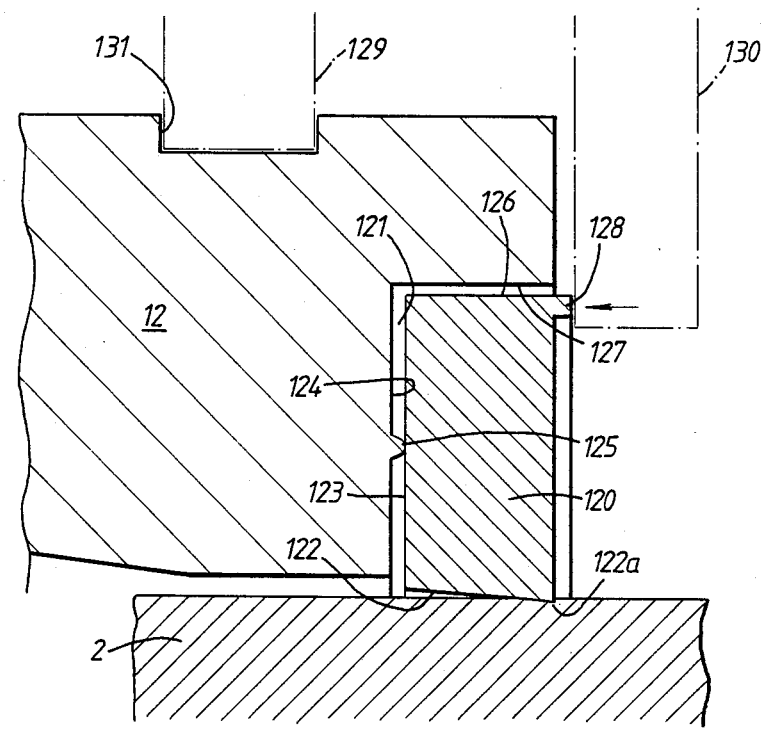
FIG. 15 is an enlarged section through the retaining means of FIG. 14.

An alternative form of retaining means for retaining the locking ring 12 in its operative locking position is shown in FIGS. 14 and 15 and may be used in place of split ring 17, in the embodiments of FIGS. 1 to 4 and 5 and 6, and split ring 17a, in the embodiment of FIGS. 7 to 9, and in the embodiment of FIG. 10 to 13 when a removable hydraulic cylinder assembly is used. The retaining means is associated with and carried by the rear end of the locking ring 12 and is engageable with a radially inner component around which the locking ring 12 extends. In the preceding embodiments this component will generally be the annular ring 2 which, in the embodiment of FIGS. 10 to 13 will need to be axially extended, as shown in FIG. 14. With suitable relative arrangement and shaping of the rings 12 and 2 and member 5, the component could alternatively be the member 5.

The retaining means comprises a retaining ring 120 which is received in a recess 121 in the rear face of locking ring 12, the recess opening into the inner circumferential surface of ring 12. The ring 120 has a frustoconical inner circumferential face 122. The smallest diameter of face 122 is at the rear end edge 122a of the ring 120 and is smaller than the diameter of the component, e.g. member 2, around which the locking ring 12 extends, and the largest diameter of the ring 120 is greater than the diameter of the ring 12. The front face 123 of the ring 120 is shaped relative to the shaping of the corresponding face 124 of the recess 121 so that there is circular line contact between the two faces, the line of contact lying radially between the inner and outer circumferential faces of the ring. This line contact may be achieved, for example, by making one face plane and the other convexly curved or by providing a projection 125 on one face, as shown the face 124 of the recess. A clearance is left between the outer circumferential face 126 of the ring 120 and the corresponding face 127 of the recess. The ring 120 is made of a material which is as hard as or harder than the material of the component which it engages and is held in the recess 121 for example by bolts extending through the ring into face 124 of the recess.

In use, the rear edge 122a of the ring 120 tends to bite into the surface of the member 2 to prevent movement of of the locking ring 12 in the direction of its inoperative position. Movement of the ring 12 in the direction of its locking position is not prevented. To release the action of the ring, an axial force is applied to a radially outer part of the ring, radially outwardly of the line of contact provided by projection 125, and in a direction tending to push the ring 120 into the recess. This force causes bending of the ring about the line of contact and this reduces the cone angle of the frustoconical face 122 and the diameter of the rear edge 122a to free this edge from its engagement with member 2. For convenience of application of the axial force, the ring 120 may, as shown, be formed with an annular nib 128 to which the force is applied. The force is conveniently applied using a hydraulic cylinder assembly which is assembled around the connector when required. The assembly may have a plurality of clamping plates of which two plates 129 and 130 are shown in FIG. 15 in broken lines, which engage annular recesses 131 and 132 in members 12 and collar 100 respectively and nib 128.

It will be appreciated that there may be a greater clearance between the ring 12 and ring 2 than that shown in FIG. 14, because it is not essential that the recess 121 be radially inwardly coextensive with the ring 120. The recess merely needs to extend radially inwardly sufficiently to provide the projection 125 or its equivalent. It will also be appreciated that the relative radial position of the line of contact provided by projection 125 determines the relative forces of engagement and disengagement of the ring. As shown the line of contact is approxiamately level with the neutral axis of the ring 120 to equalise the forces.

In relation to all the above described embodiments, although cooperating pairs of surfaces 15, 16, 25, 26 are described as being generally frusto-conical, it will be appreciated that one or more of the surfaces of each pair may for example be curved to make a part spherical surface.

While the connectors have been described above in terms of pipe connectors, it will be appreciated that the invention is equally applicable to the connection of solid members or other tubular members than pipes or multi-bored components. The members 5 and 8 and associated components can be made from any suitable material, e.g., plastic or metal depending on use requirements. If the connector is for use subsea it will be made from an appropriate steel.

There are thus provided releasable connectors which are simple to couple by the use of axial forces only, and can provide a pre-load on abutted surfaces of the coupling members to be connected.

What is claimed is:

1. A connector comprising a first coupling assembly comprising a first coupling member for coupling to a second coupling member, an annular body provided on said first coupling member for connecting said first coupling member to said second coupling member, said annular body having a plurality of radially flexible fingers extending generally axially therefrom, said fingers being provided in end portions thereof with first engagement means for engagement with corresponding second engagement means on said second coupling member, said fingers being radially flexible between an inoperative position and an operative position in which said first and second engagement means are engaged, a locking ring axially movable relative to the annular body of the first coupling assembly between a disengagement position and a locking position in which said locking ring extends around said fingers so as to prevent disengagement of said first and second engagement means, and a plurality of members each said guide member extending between a pair of said fingers and adapted to prevent contact between said first and second engagement means when said fingers are in their inoperative position.

2. A connector as claimed in claim 1, wherein said plurality of members comprise generally axially extending radially inner edge portions which are arranged to extend radially inwardly of said first engagement means provided on said fingers when said fingers are in their inoperative position and to extend radially outwardly of said first engagement means provided on said fingers when said fingers are in their operative position.

3. A connector as claimed in claim 1, wherein said plurality of members are mounted on said first coupling member.

4. A connector as claimed in claim 1, wherein said plurality of members are in the form of radially extending vanes, the radially inner edge portions of which together define a guide surface for guiding said second coupling member.

5. A connector as claimed in claim 4, wherein said guide surface is generally frusto-conical.

6. A connector as claimed in claim 4, wherein the shape of said guide surface conforms generally to that of said second coupling member in the region of said second engagement means.

7. A connector as claimed in claim 1, wherein said plurality of members comprise axially extending radially outer edge portions which serve to guide said locking ring in its movement between its disengagement position and its locking position.

8. A connector as claimed in claim 6, comprising disengagement means which are engageable with said fingers to move said fingers from their operative position for disengaging said engagement means to permit uncoupling of said first and second coupling members.

9. A connector as claimed in claim 8, wherein said disengagement means is associated with said locking ring and is movable therewith to engage said fingers as said locking ring moves from its locking position to its disengagement position.

10. A connector as claimed in claim 8, wherein said disengagement means comprises an annular body having a generally frusto-conical surface engageable with a corresponding generally frusto-conical surface of end portions of said fingers to move said fingers radially outwardly to disengage said first and second engagement means.

11. A connector as claimed in claim 8, wherein said disengagement means is fixed to said locking ring.

12. A connector as claimed in claim 8, wherein said disengagement means forms part of said locking ring.

13. A connector as claimed in claim 1, wherein said fingers are in a relaxed condition in their operative position.

14. A connector as claimed in claim 1, wherein said fingers are in a relaxed condition in their inoperative position.

15. A connector as claimed in claim 1, wherein said locking ring has an internal frusto-conical surface engageable with corresponding part frusto-conical surfaces of said fingers to ensure that said fingers move radially inwardly to their operative positions on movement of said locking ring from its disengagement position to its locking position.

16. A connector as claimed in claim 1, comprising releasable locking means operable to prevent movement of said locking ring from its locking position.

17. A connector as claimed in claim 16, wherein said locking means is operable to lock said locking ring to at least one of said first coupling member, said second coupling member and said annular body.

18. A connector as claimed in claim 1, wherein said first engagement means comprises at least one circumferentially extending rib formed on the inner surfaces of said fingers, which rib is engageable in a correspondingly shaped recess in the outer surface of said second coupling member.

19. A connector as claimed in claim 18, wherein said rib and recess are shaped so as to draw said coupling members into abutment as said first and second engagement means are engaged.

20. A connector as claimed in claim 18, wherein said rib and recess are shaped so as to pre-load abutted surfaces of said coupling members as said first and second engagement means are engaged.

21. A connector as claimed in claim 1, wherein said coupling members are one of solid, tubular and multi-bored.

22. A connector as claimed in claim 1, wherein said coupling members have annular end surfaces which are brought into abutment when coupled.

23. A connector as claimed in claim 1, comprising sealing means for sealing between said coupling members when coupled.

24. A connector as claimed in claim 1, comprising fluid cylinder assembly means for moving said locking ring relative to said first coupling member.

25. A connector as claimed in claim 1, wherein said annular body is mounted on said first coupling member for axial movement relative thereto.

26. A connector as claimed in claim 1, wherein said annular body is formed integrally with said first coupling member.

27. A connector as claimed in claim 1, wherein said annular body is formed separately of said first coupling member and fixed relative thereto.

28. A connector comprising a first coupling assembly comprising a first coupling member for coupling to a second coupling member, an annular body provided on said first coupling member for connecting said first coupling member to said second coupling member, said annular body having a plurality of radially flexible fingers extending generally axially therefrom, said fingers being provided in end portions thereof with first engagement means for engagement with corresponding second engagement means on said second coupling member, said fingers being radially flexible between an inoperative position and an operative position in which said first and second engagement means are engaged, a locking ring axially movable relative to the annular body of the first coupling assembly between a disengagement position and a locking position in which said locking ring extends around said fingers so as to prevent disengagement of said first and second engagement means, and a plurality of guide members, each said guide member extending between a pair of said fingers for guiding said second coupling member relative to said first coupling member, said guide members defining generally axially extending radially inner edge portions in the region of said first engagement means of said fingers which edge portions lie radially inwardly of said first engagement means when said fingers are in their operative position and radially outwardly of said first engagement means when said fingers are in their operative position.

29. A connector comprising a first coupling assembly comprising a first coupling member for coupling to a second coupling member, an annular body provided on said first coupling members for connecting said first coupling member to said second coupling member, said annular body having a plurality of radially flexible fingers extending generally axially therefrom, said fingers being provided in end portions thereof with first engagement means for engagement with corresponding second engagement means on said second coupling member, said fingers being radially flexible between an inoperative position and an operative position in which said engagement means are engaged, a locking ring axially movable relative to the annular body of the first coupling assembly between a disengagement position and a locking position in which said locking ring extends around said fingers so as to prevent disengagement of said first and second engagement means, disengagement means associated with said locking ring and for movement therewith, said disengagement means being engageable with the free ends of said fingers as said locking ring moves from its locking position to its disengagement position to move said fingers from their operative position to their inoperative position for disengaging said first and second engagement means to permit uncoupling of said first and second coupling members, and a plurality of members, each said guide member extending between a pair of said fingers, said plurality of members defining generally axially extending radially inner edge portions in the region of said first engagement means of said fingers which edge portions lie radially inwardly of said first engagement means when said fingers are in their inoperative position and radially outwardly of said first engagement means when said fingers are in their operative position.

* * * * *

UNITED STATES PATENT AND TRADEMARK OFFICE
CERTIFICATE OF CORRECTION

PATENT NO. : 4,902,045

DATED : February 20, 1990

INVENTOR(S) : John D. McGugan et al.

It is certified that error appears in the above-identified patent and that said Letters Patent is hereby corrected as shown below:

Title page:

[30] Foreign Application Priority Data

Dec. 18, 1986 [GB] United Kingdom ....... 8630239
Sept. 23, 1987 [GB] United Kingdom ...... 8722395

Signed and Sealed this

Twenty-sixth Day of March, 1991

Attest:

HARRY F. MANBECK, JR.

Attesting Officer

Commissioner of Patents and Trademarks